Feb. 14, 1950
W. HIRST
2,497,771
CAM FOR SHOVELS
Filed Oct. 3, 1947
2 Sheets-Sheet 1
Fig.1.
Fig.2.
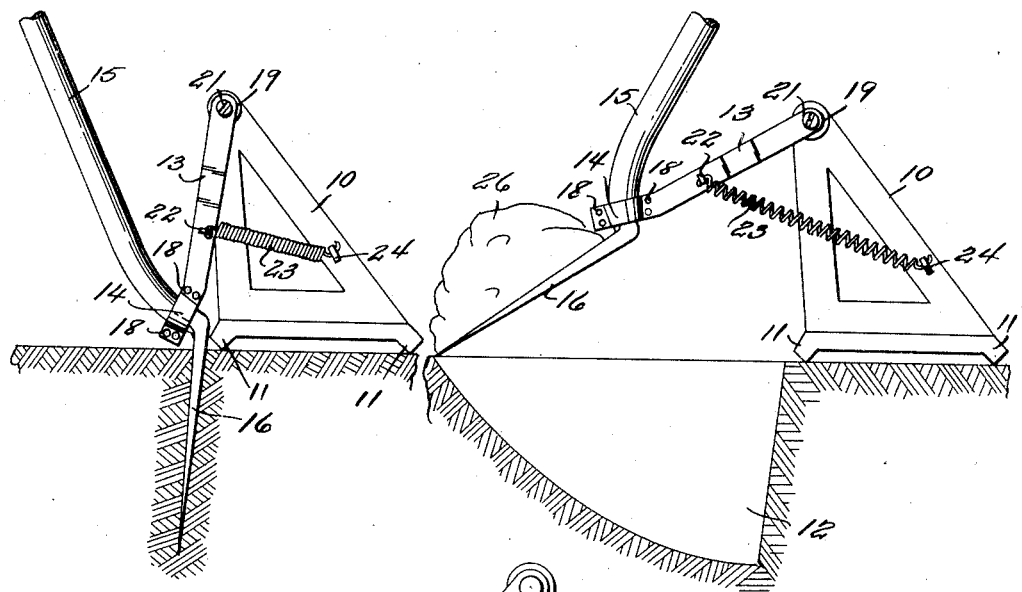
Fig.3.
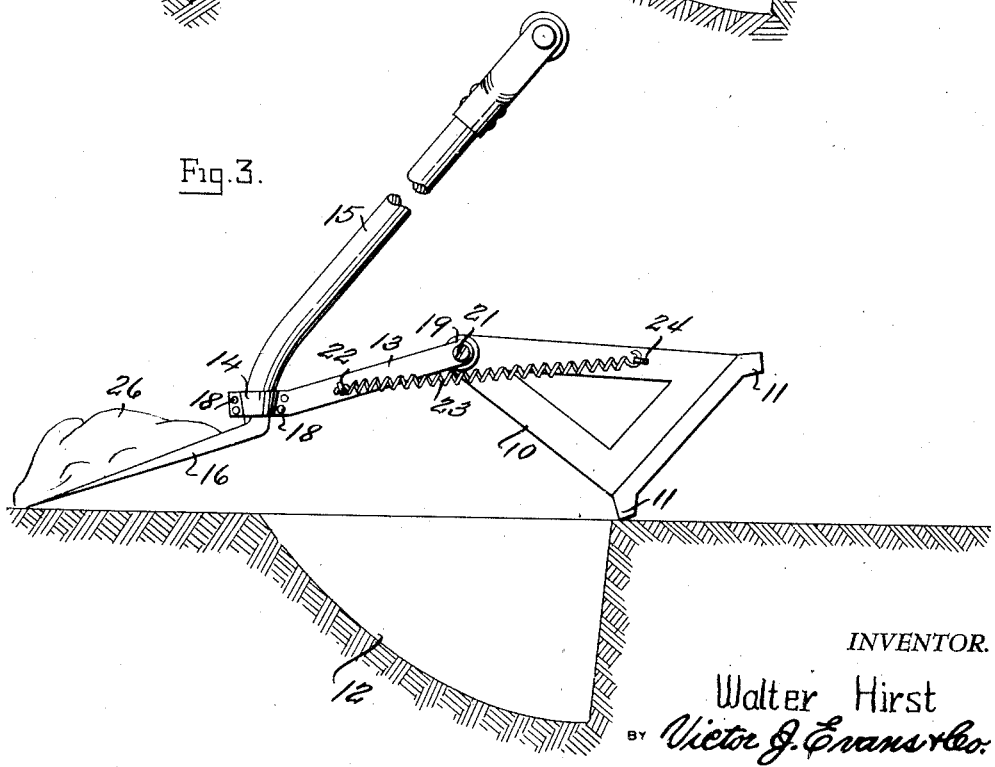
INVENTOR.
Walter Hirst
BY *Victor J. Evans & Co.*
ATTORNEYS Feb. 14, 1950 W. HIRST 2,497,771
CAM FOR SHOVELS
Filed Oct. 3, 1947 2 Sheets-Sheet 2
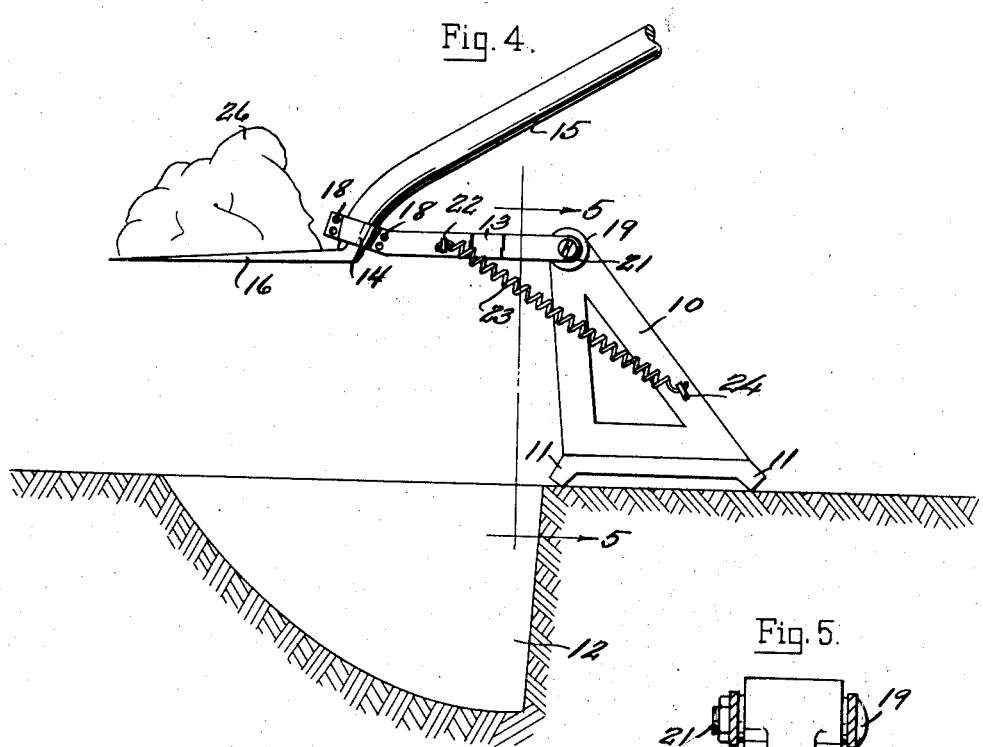
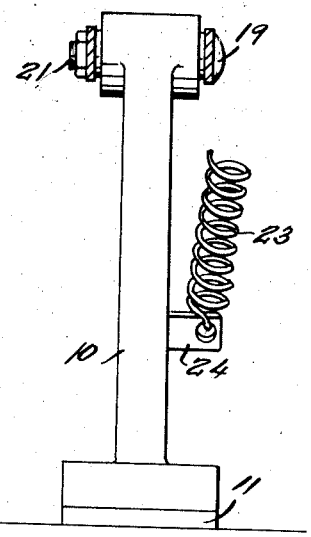
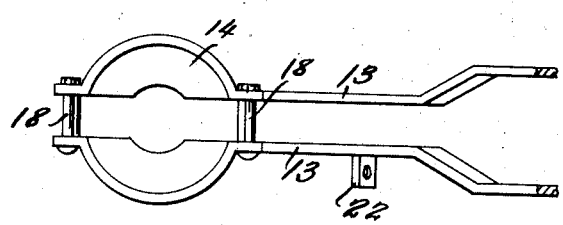
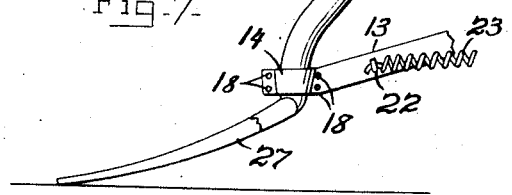
INVENTOR.
Walter Hirst
BY Victor J. Evans & Co.
ATTORNEYS Patented Feb. 14, 1950

2,497,771

UNITED STATES PATENT OFFICE 2,497,771

CAM FOR SHOVELS

Walter Hirst, Cranston, R. I.

Application October 3, 1947, Serial No. 777,781

2 Claims. (Cl. 254—131.5)

This invention relates to a fulcrum attachment for shovels.

It is an object of the present invention to provide a fulcrum attachment adapted for use on a shovel which is light in weight and upon which the shovel will be supported when effecting the removal of the dirt from an opening being formed in the ground by the shovel and whereby the removal of the shovel from the ground with the dirt is facilitated and whereby it will be unnecessary for the user of the shovel to stoop to effect the initial removal of the dirt from the opening.

Other objects of the present invention are to provide a fulcrum attachment for shovels which is of a simple construction, made of a minimum number of parts, inexpensive to manufacture, and efficient in operation.

For a better understanding of the invention, reference may be had to the following detailed description taken in connection with the accompanying drawing, in which:

Figure 1 is the side elevation or view of the fulcrum attachment and with the shovel extended downwardly into the ground before any movement of the shovel has been made to remove the dirt from the opening;

Figure 2 is a side elevational view of the attachment and of the shovel after the shovel has been pivoted on the attachment and lifted to a location to elevate the dirt out of the opening;

Figure 3 is a side elevational view of the attachment and of the shovel when the shovel has been extended to the opposite side of the opening to discharge the dirt thereupon;

Figure 4 is a side elevational view of the fulcrum attachment with the shovel elevated to a point above the opening as when the dirt on the shovel is to be removed to a more distant location from the opening;

Figure 5 is the enlarged cross-sectional view, elevation of the attachment and as viewed on line 5—5 of Figure 4;

Figure 6 is an enlarged fragmentary view of the fulcrum attachment and looking in plan into the socket opening into which the shovel is fitted and Figure 7 is a fragmentary elevational view of the device as applied to a single fork.

Referring now to the figures, 10 represents a frame having foot portions 11 thereon adapted to engage with the ground surface above a location or opening to be formed in the ground. This frame 10 extends upwardly and forwardly so that its top may overhang to some extent an opening 12 in the ground to be made free of dirt. On the upper end of the frame there is pivoted an arm 13 having a socket formation 14 adapted to receive and support the lower end of a shovel handle 15 and dirt-engaging portion 16 thereon. This arm is turned up at the outer end to better accommodate the shovel. The arm 13 is formed of two parts, each of said parts includes a portion of the socket. The parts are connected together by bolts 18 whereby to provide good clamping engagement with the shovel handle. The separable parts of the arm 13 are connected as indicated at 19 by a pivot bolt 21 at the top of the support 10. An ear 22 extends from one part of the arm and to this ear is connected a tension spring 23 which is anchored at an ear projection 24 on the support 10 so as to normally return the arm 13 and retain it in its lowered position.

In operation, the shovel is first thrust into the ground as shown in Figure 1, and both feet portions 11 will be located on the ground surface. The handle 15 will extend forwardly but as the same is drawn rearwardly, the portion 16 will lift dirt 26 from the opening 12. If during this operation, some slight pressure is maintained on the top of the portion 16, the action described will be more complete in its operation. The arm 13 will be extended forwardly against the action of the spring 23. This motion will have been effected by merely pivoting the bolt on the upper end of the same and avoids having to stoop to lift the shovel. As soon as the shovel portion 16 with the dirt 26 has been extended above the far edge of the opening 12, it can be pushed forwardly to discharge its load of dirt. Therefore, the support 10 will pivot on the forward foot portion in the manner, as shown in Figure 3. If it is desired to remove the dirt to a location other than to the immediate opposite side of the opening 12, the shovel can be raised to a greater extent as shown in Figure 4 and lifted with the attachment to locate the dirt at the more distant location. When the shovel with the attachment is lifted from the ground, the support 10 will be brought into engagement with the arm 13 and through the arm the attachment will be retained on the shovel. The attachment is preferably formed of light weight aluminum so that it adds little weight to the shovel.

While the invention has been specifically applied to a shovel, it is possible to use the device with a single fork 27, as shown in Figure 7. The fork 27, in this instance, has a handle 28 which is similar in configuration to the handle 15 of the shovel 16. Some forks are not provided with this form of handle and cannot be successfully used with the device, but single forks of the nature shown in Figure 7 can be successfully used as desired.

Thus this invention can be applied to forks or shovels, providing the handles are similarly formed.

While various changes may be made in the detailed construction, it shall be understood that such changes shall be within the spirit and scope of the present invention, as defined in the appended claims.

I claim:

1. A fulcrum attachment for a shovel and the like comprising an upright support having portions adapted to engage with the ground surface, an arm pivotally connected to the upper end of the support for fore and aft swinging movement, said arm having been adapted to receive and retain a shovel, said support being formed at its top to overhang its bottom part and said arm having a portion turned up to accommodate the lower end of the handle so that the dirt-engaging portion of the shovel will extend in longitudinal alignment with the arm and whereby to better accommodate the curved lower end of the handle of the shovel.

2. The invention as in claim 1 wherein spring tension means extends between the arm and support to normally retain the arm on the support in its retracted or rearward position.

WALTER HIRST.

REFERENCES CITED

The following references are of record in the file of this patent:

FOREIGN PATENTS

| Number | Country | Date |
|---|---|---|
| 560,616 | France | July 16, 1923 |